United States Patent
Kellner et al.

(10) Patent No.: US 12,381,263 B2
(45) Date of Patent: Aug. 5, 2025

(54) PROTECTIVE ARRANGEMENT FOR VEHICLE BATTERY

(71) Applicant: Dr. Ing. h.c. F. Porsche Aktiengesellschaft, Stuttgart (DE)

(72) Inventors: Philipp Kellner, Rennigen (DE); Teiwen Fehse, Stuttgart (DE); Christopher Volkmer, Niefern-Öschelbronn (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 548 days.

(21) Appl. No.: 17/903,088

(22) Filed: Sep. 6, 2022

(65) Prior Publication Data
US 2023/0073416 A1 Mar. 9, 2023

(51) Int. Cl.
*H01M 10/48* (2006.01)
(52) U.S. Cl.
CPC ........ *H01M 10/48* (2013.01); *H01M 2220/20* (2013.01)
(58) Field of Classification Search
None
See application file for complete search history.

(56) References Cited

U.S. PATENT DOCUMENTS

| | | | |
|---|---|---|---|
| 9,440,523 B2 | 9/2016 | Decker | |
| 2008/0084180 A1* | 4/2008 | Hasegawa | H01M 50/583 |
| | | | 320/112 |
| 2017/0261473 A1* | 9/2017 | Sung | G01N 29/4481 |
| 2020/0335833 A1 | 10/2020 | Schmidt | |
| 2021/0336298 A1* | 10/2021 | Thurmeier | H01M 10/48 |

FOREIGN PATENT DOCUMENTS

| | | |
|---|---|---|
| DE | 102013013754 A1 | 8/2014 |
| DE | 102014017990 A1 | 6/2015 |
| DE | 102014107388 A1 | 11/2015 |
| DE | 102016103411 A1 | 8/2017 |
| DE | 102016207231 A1 | 11/2017 |
| DE | 102017212273 A1 | 1/2019 |
| DE | 102018204374 A1 | 9/2019 |
| DE | 102018221331 A1 | 6/2020 |
| DE | 102019204864 B3 | 7/2020 |
| DE | 102019204863 A1 | 10/2020 |
| DE | 102019119996 A1 | 1/2021 |
| EP | 2725651 A2 | 4/2014 |

* cited by examiner

*Primary Examiner* — Thomas S McCormack
(74) *Attorney, Agent, or Firm* — Buchanan Ingersoll & Rooney PC

(57) ABSTRACT

An apparatus includes a battery arrangement and a protective arrangement. The protective arrangement includes a first layer, a second layer, a third layer disposed between the first layer and the second layer, and acceleration sensors. The third layer has a layer volume that can be reduced under the effect of pressure. The acceleration sensors include at least one first acceleration sensor and at least one second acceleration sensor. The least one first acceleration sensor is disposed in contact with the first layer and is configured to generate and output a first sensor signal as a function of the acceleration and wherein the at least one second acceleration sensor is disposed in contact with the second layer and is configured to generate and output a second sensor signal (SIG2) as a function of the acceleration in order to enable detection of damage to the protective arrangement.

18 Claims, 2 Drawing Sheets

PROTECTIVE ARRANGEMENT FOR VEHICLE BATTERY

CROSS-REFERENCE TO RELATED APPLICATION

This application claims priority to German Patent Application No. 10 2021 122 956.1, filed Sep. 6, 2021, the content of such application being incorporated by reference herein in its entirety.

FIELD OF THE INVENTION

The invention relates to an apparatus comprising a protective arrangement and a battery arrangement and to a vehicle comprising such an apparatus.

BACKGROUND OF THE INVENTION

DE 10 2018 221 331 A1, which is incorporated by reference herein, shows an apparatus for detecting mechanical damage to a motor vehicle component, wherein two components which are electrically separated from one another come into contact as a result of a deformation.

DE 10 2018 204 374 A1, which is incorporated by reference herein, shows a high-voltage battery comprising a detection apparatus for damage, wherein the detection apparatus comprises a pressure sensor for measuring the pressure in the battery housing.

DE 10 2017 212 273 A1, which is incorporated by reference herein, shows a detection apparatus comprising a sensor element, which can be attached to a housing and outputs an electrical measured value.

DE 10 2014 017 990 A1, which is incorporated by reference herein, shows a battery comprising a sensor device, wherein the sensor device comprises a chamber and a pressure sensor for measuring the gas pressure in the chamber.

DE 10 2013 013 754 A1, which is incorporated by reference herein, shows a high-voltage battery comprising an acceleration sensor by means of which mechanical shocks can be detected.

EP 2 725 651 B1, which is incorporated by reference herein, shows a secondary battery having a sensor apparatus, which comprises a first sensor for detecting a movement of a battery cell and a second sensor for detecting a movement of a battery housing.

SUMMARY OF THE INVENTION

An apparatus comprises a battery arrangement and a protective arrangement, wherein the protective arrangement comprises a first layer, a second layer, a third layer disposed between the first layer and the second layer, and acceleration sensors, wherein the third layer has a layer volume that can be reduced under the effect of pressure, wherein the acceleration sensors include at least one first acceleration sensor and at least one second acceleration sensor, wherein the at least one first acceleration sensor is disposed in contact with the first layer and is configured to generate and output a first sensor signal as a function of the acceleration and wherein the at least one second acceleration sensor is disposed in contact with the second layer and is configured to generate and output a second sensor signal as a function of the acceleration in order to enable detection of damage to the protective arrangement. The layer structure with the acceleration sensors in the first layer and in the second layer, together with the (partial) decoupling by the compressible third layer, enables a comparatively accurate prediction of the deformation or destruction of the protective arrangement and thus also a good prediction of possible destruction of the battery arrangement.

According to a preferred embodiment, at least two first acceleration sensors and at least two second acceleration sensors are provided, further preferably at least four of each.

According to a preferred embodiment, the protective arrangement is plate-shaped. A plate-shaped configuration facilitates protection of the battery arrangement and enables good pressure distribution.

According to a preferred embodiment, the first layer and the second layer are non-compressible or at least less compressible than the third layer. This increased the diagnostic relevance of the measurements of the acceleration sensors.

According to a preferred embodiment, the protective arrangement is sealed against moisture in at least one predetermined first region and the acceleration sensors are at least partly disposed in said at least one predetermined first region in order to enable protection against moisture.

According to a preferred embodiment, the protective arrangement is spaced apart from the battery arrangement at least in some sections. The spacing produces a special correlation between an effect on the protective arrangement and a resulting effect on the battery arrangement, which is advantageous for the evaluation. It can in particular be easier to decide whether or not there is a risk of damage to the battery arrangement if there is slight damage to the protective arrangement. These relationships can be studied in simulations or in actual tests.

According to a preferred embodiment, at least one cooling arrangement is disposed at least in regions between the battery arrangement and the protective arrangement. Such a cooling arrangement can serve to provide additional protection against mechanical deformation of the battery arrangement due to the coolant.

The cooling arrangement is preferably configured as a cooling plate. Cooling plates can easily be mounted on many different battery arrangements.

According to a preferred embodiment, the protective arrangement abuts the battery arrangement at least in regions directly itself or via a spacer element. This makes it possible to prevent the protective arrangement from experiencing strong acceleration and striking the battery arrangement at a high relative speed.

According to a preferred embodiment, the battery arrangement comprises at least two battery module housings. This facilitates handling during assembly.

According to a preferred embodiment, the third layer comprises at least one substance from the group of substances consisting of:
foam,
gas,
gas/liquid mixture,
thermoplastic foam,
elastomeric foam and
rigid foam.

All of these substances or groups of substances contain gas, for example air or pure carbon dioxide, and are thus compressible and lead to a partial decoupling between the first layer and the second layer.

According to a preferred embodiment, the first layer comprises a first composite material and the second layer comprises a second composite material. In conjunction with the acceleration sensors, the use of a first composite material for the first layer and a second composite material for the second layer has resulted in an advantageous combination, which enables a comparatively accurate prediction of the deformation or destruction of the protective arrangement and thus also a good prediction of possible destruction of the battery arrangement.

According to a preferred embodiment,
the first composite material,
the second composite material, or
the first composite material and the second composite material
are configured as fiber composite materials comprising first fibers. The first composite material and the second composite material can be the same, but do not have to be the same. The fibers advantageously enable a good prediction of damage to the protective arrangement.

According to a preferred embodiment, the apparatus comprises an evaluation device, wherein the evaluation device is configured to receive and evaluate the at least one first sensor signal and the at least one second sensor signal. Such an evaluation device enables a good evaluation with a high probability of success for the result.

According to a preferred embodiment, the evaluation device is configured to determine the degree of damage to the protective arrangement as a function of the at least one first sensor signal and the at least one second sensor signal. Taking into account the sensor signals from the first and from the second layer enables a higher accuracy of the damage estimation than from one layer alone.

According to a preferred embodiment, the evaluation device is configured to calculate the difference between a first acceleration value of the at least one first sensor signal and a second acceleration value of the at least one second sensor signal in order to determine the degree of damage to the protective arrangement. The difference enables a better categorization of the type of damage.

According to a preferred embodiment, the evaluation device is configured, over the temporal progression
of the at least one first sensor signal,
of the at least one second sensor signal, or
of the at least one first sensor signal and the at least one second sensor signal, to determine a first time range in which an impact of the protective arrangement against the battery arrangement occurs, and to determine the degree of damage as a function of the information of said sensor signal or said sensor signals in said first time range. It is easily possible to assess the impact or collision in this time range. The damage to the battery arrangement can consequently be better estimated.

According to a preferred embodiment, at least two first acceleration sensors and at least two second acceleration sensors are provided, and
the information of the first sensor signals or
the information of the second sensor signals
is used to determine the areal extent of the damage to the protective arrangement in the first layer or in the second layer. The effect of damage on multiple spaced apart acceleration sensors in the same layer gives a good indication of the type and geometry of the colliding object.

A vehicle that is operated electrically or partially electrically comprises such an apparatus. The apparatus makes it possible to make a good prediction as to whether or not (potentially critical or non-critical) damage is present.

According to a preferred embodiment, the evaluation device is configured to carry out a categorization as a function of the at least one first sensor signal and the at least one second sensor signal, wherein the categorization comprises at least two categories from the category group consisting of:
no action required,
replacement of the protective arrangement required at the next service,
visit to a workshop required,
parking the vehicle required, and
parking and immediately exiting the vehicle required.

These categories greatly increase the safety of the vehicle and its occupants.

According to a preferred embodiment, the vehicle comprises a communication device and the evaluation device is configured to enable at least one output via the communication device from the output group consisting of:
output of information from the evaluation device to an output apparatus in the vehicle,
output of information from the evaluation device to a server of a workshop,
output of information from the evaluation device to a server of a fire department,
output of information from the evaluation device to a server of a police station, and
output of information from the evaluation device to other road users.

These outputs can significantly increase safety for the occupants and for the immediate surroundings.

According to a preferred embodiment, the vehicle comprises electrical leads to the battery arrangement and a switching apparatus for interrupting said electrical leads, and the evaluation device is configured to enable actuation of the switching apparatus in order to enable disconnection of the battery arrangement in the event of damage to the protective arrangement. On the one hand, this measure can reduce or prevent further damage to the battery and, on the other hand, protect consumers.

BRIEF DESCRIPTION OF THE DRAWINGS

Further details and advantageous further developments of the invention will emerge from the design examples, which are described below and illustrated in the drawings and are not to be construed as limiting the invention in any way, and from the subclaims. It goes without saying that the features mentioned above and those yet to be discussed below can be used not only in the respectively specified combination, but also in other combinations or on their own, without leaving the scope of the present invention. The figures show:

DETAILED DESCRIPTION OF THE INVENTION

Parts that are the same or have the same effect are provided with the same reference signs in the following, and are usually described only once. The descriptions of all of the figures build on one another in order to avoid unnecessary repetitions.

Figure 1:
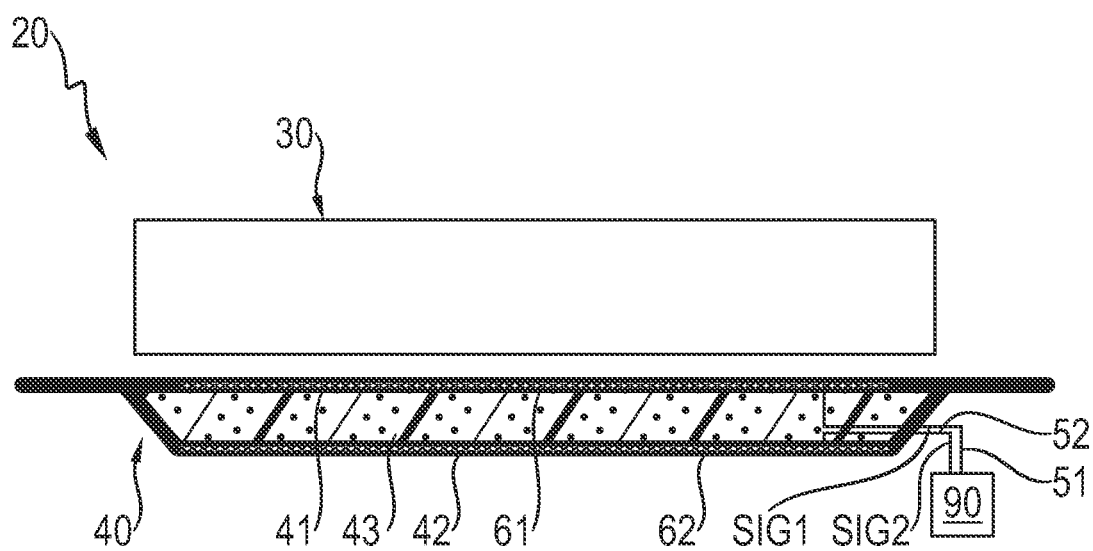
FIG. 1, in a schematic cross-section, a design example of an apparatus comprising a battery arrangement and a protective arrangement, FIG. 2, in a schematic plan view, a design example of a layer of the protective arrangement, FIG. 3, in a three-dimensional illustration, another design example of the apparatus of FIG. 1, and FIG. 4, in a schematic illustration, a vehicle comprising the apparatus of FIG. 1.

FIG. 1 shows an apparatus 20 comprising a battery arrangement 30 and a protective arrangement 40.

Such an apparatus 20 can preferably be used in a vehicle, wherein the protective arrangement 40 forms an underbody protection of the vehicle, for example, which protects the battery arrangement 30 in the event of an accident or damage caused by a bollard.

The protective arrangement 40 comprises a first layer 41, a second layer 42, and a third layer 43 disposed between the first layer 41 and the second layer 42. Further intermediate layers can be provided between the first layer 41 and the second layer 42 in addition to the third layer 43.

First acceleration sensors 61 are disposed in contact with the first layer 41, and second acceleration sensors 62 are disposed in contact with the second layer 42. The acceleration sensors 61, 62 are thus positioned in the associated layer 41, 42 or on the associated layer 41, 42, for example.

The acceleration sensors 61 are connected to an evaluation device 90, for instance via a signal lead 51, and are configured to generate a first sensor signal SIG1 as a function of the acceleration at the respective acceleration sensor 61 and to output said signal via the signal lead 51.

The acceleration sensors 62 are connected to the evaluation device 90, for instance via a signal lead 52, and are configured to generate a second sensor signal SIG2 as a function of the acceleration at the respective acceleration sensor 62 and to output said signal via the signal lead 52.

The signal leads 51, 52 can also be configured as one common signal lead.

The evaluation device 90 is configured to receive and evaluate the sensor signals SIG1, SIG2 of the acceleration sensors 61, 62 in order to determine the degree of damage to the protective arrangement 40 and indirectly also to the battery arrangement 30 as a function of the first sensor signals SIG1 and the second sensor signals SIG2. Evaluation device 90 may be a computer having a processor, controller, memory and executable software, for example.

In the design example, the protective arrangement 40 is plate-shaped.

The first layer 41 preferably comprises a first composite material and the second layer 42 preferably comprises a second composite material.

Composite materials consist of two or more combined materials. As a result of the composite, the composite material has different material properties than its individual components do. Depending on the geometry of the composite, a distinction is made, for example, between:
- particle composite materials,
- fiber composite materials,
- layered composite materials,
- impregnated composite materials and
- structural composite materials.

Preferably, fiber composite materials are used for the first layer 41 and for the second layer 42 because tests have shown that fiber composite materials allow a good correlation between damage to the protective arrangement 40 and damage to the battery arrangement 30.

The protective arrangement 40 is preferably spaced apart from the battery arrangement 30 at least in some sections and, in the design example, the protective arrangement 40 is entirely spaced apart from the battery arrangement 30. The spacing makes it easier to distinguish whether there is slight damage to the protective arrangement 40 without damage to the battery arrangement 30, or whether there is significant damage to the protective arrangement 40 and thus in all likelihood also damage to the battery arrangement 30.

The third layer 43 has a layer volume which can be reduced under the effect of pressure, i.e., it is compressible. This property can in particular be achieved in that the third layer comprises a gas. The third layer 43 can be made of a foam, for example; it can be configured as a thermoplastic foam, an elastomeric foam or a rigid foam.

The first layer 41 and the second layer 42 are preferably largely incompressible, so that the volume hardly changes when the pressure is increased and deformation can occur.

The first layer 41 and the second layer 42 are preferably non-compressible or at least less compressible than the third layer 43.

By evaluating the sensor signals SIG1, SIG2, the evaluation device 90 can use the measurement result to characterize at which location and how severe the damage to the protective arrangement 40 is.

In operation, the protective arrangement 40 protects the battery arrangement 30.

The protective arrangement 40 is preferably sealed against moisture in at least one predetermined first region and the acceleration sensors 61, 62 are at least partly disposed in said at least one predetermined first region in order to enable protection against moisture. The acceleration sensors 61, 62 can be injection-molded into the associated layer 41, 42, for example, and thus protected, or they can be disposed on the respective inner side of the associated layer 41, 42, whereby the first layer 41 together with the second layer 42 seals the interior space and thus protects the acceleration sensors 61, 62.

Figure 2:
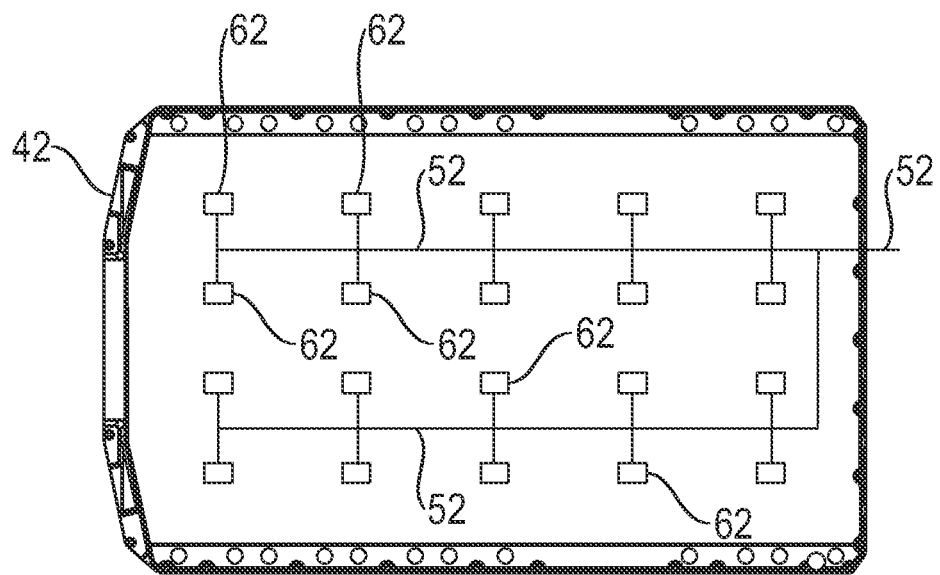

FIG. 2 shows the inner side of the second layer 42 of the protective arrangement 40. The acceleration sensors 62 are distributed over the second layer 42 and are each connected to the signal lead 52.

The more acceleration sensors 62 are disposed on the second layer 42, the more accurately the areal extent of the damage can be determined by the evaluation device 90 in the event of damage. A large areal extent does not necessarily mean that there is a large amount of damage, because the forces that occur in the case of a bollard, for example, are distributed over a larger area than in a case of penetration of an iron bar.

Figure 3:
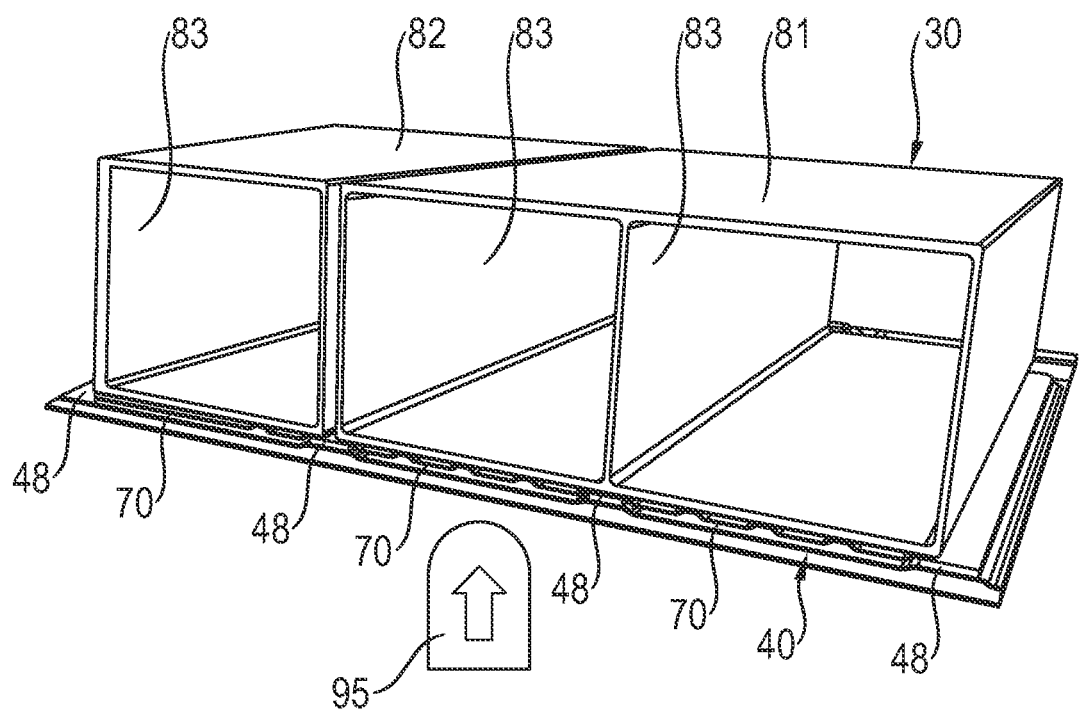

FIG. 3 shows another embodiment of the apparatus 20, in which the battery arrangement 30 comprises two battery module housings 81, 82. In this case, the battery module housings 81, 82 can preferably be screwed directly into the body of a vehicle. The battery module housings 81, 82 are then preferably load-bearing. The battery cells of the battery arrangement 30 and the electronics are not shown.

In the design example, cooling arrangements 70 are disposed at least in regions between the protective arrangement 40 and the battery arrangement 30. The cooling arrangements 70 are preferably configured as cooling plates. The protective arrangement 40 is preferably in contact with the battery arrangement 30 in some sections via spacer elements 48. The contact points defined by the spacer elements 48 in the design example are preferably located at positions at which a vertical structure 83 of the battery arrangement 30 is provided. In the design example, the vertical structure 83 is in the form of side walls of the battery arrangement 30. This enables a good introduction of force in the event of a deformation of the protective arrangement 40.

As an alternative to the spacer elements 48, the protective arrangement 40 can comprise projections that are in direct contact with or abut the battery arrangement 30.

The FIG. includes a schematic drawing of a bollard 95, which can exert a force from below against the protective arrangement 40 and potentially lead to the destruction of the protective arrangement 40 and/or the battery arrangement 30.

Figure 4:
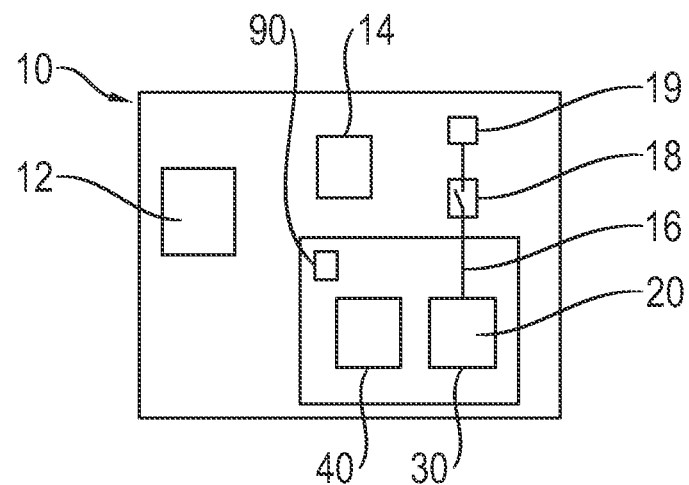

FIG. 4 schematically illustrates a vehicle 10 comprising an apparatus 20, a communication device 12, an output apparatus 14, electrical leads 16 and a switching apparatus 18. The electrical leads 16 are connected to the battery arrangement 30 and, in the design example, electrically connect an electric motor 19 of the vehicle 10 to the battery arrangement 30. The switching apparatus 18 is configured to enable an interruption of the electrical leads 16 for a main current of the battery arrangement 30. The evaluation device 90 is configured to enable actuation of the switching apparatus 18 in order to enable disconnection of the battery arrangement 30 in the event of damage to the protective arrangement 40.

The switching apparatus 18 is configured in the form of contactors or electronic switches, for example.

The evaluation device 90 is preferably configured to determine the degree of damage to the protective arrangement 40 as a function of the at least one first sensor signal SIG1 and the at least one second sensor signal SIG2. By evaluating both sensor signals, the damage can be determined more accurately than if only the first layer 41 or only the second layer 42 are considered.

The evaluation device 90 is preferably configured to calculate the difference between a first acceleration value of the at least one first sensor signal SIG1 and a second acceleration value of the at least one second sensor signal in order to determine the degree of damage to the protective arrangement 40. The difference can be used as an absolute value or with a sign. For example, the difference provides information as to whether damping of the vibration or impact on the underside of the protective arrangement 40 by the third layer was possible or not. General vibrations of the vehicle 10 moreover result in small differences, whereas a large difference can occur if there is localized damage in the region of the protective arrangement 40. Limit values for determining the degree of damage as a function of the difference and also as a fundamental function of the sensor signals can be determined for the respective vehicle type by means of tests or simulations.

Preferably, the evaluation device 90 is configured, over the temporal progression
of the at least one first sensor signal SIG1,
of the at least one second sensor signal SIG2, or
of the at least one first sensor signal SIG1 and the at least one second sensor signal SIG2, to determine a first time range in which an impact of the protective arrangement 40 against the battery arrangement 30 has occurred, and to determine the degree of damage as a function of the information of said sensor signal SIG1, SIG2 or said sensor signals SIG1, SIG2 in said first time range. The sensor signals SIG1 and SIG2 have a temporal progression, and the impact of the protective arrangement 40 against the battery arrangement 30 leads to a deceleration and therefore a negative acceleration of the protective arrangement 40. The corresponding time window can thus be determined by the evaluation device 90, and the range of values in this time window enables a good determination of the degree of damage to the battery arrangement 30.

The evaluation device 90 is preferably configured to carry out a categorization as a function of the at least one first sensor signal (SIG1) and the at least one second sensor signal (SIG2), wherein the categorization comprises at least two categories from the category group consisting of:

no action required, in particular if everything is in order,
replacement of the protective arrangement 40 required at the next service, e.g., in the event of minor damage to the protective arrangement of 5% or 10%,
visit to a workshop required, e.g., in the event of slight damage to the protective arrangement 40 of 10% or 15% and/or suspicion of damage to the battery arrangement 30,
parking the vehicle 10 required, e.g., in the event of more severe damage to the protective arrangement 40 of at least 20% or 30% and
parking and immediately exiting the vehicle 10 required, e.g., in the event of severe damage to the protective arrangement of at least 35% of the surface area and suspected critical damage to the battery arrangement 30.

The categorization preferably comprises at least three, four or five categories from the category group.

The evaluation device 90 is preferably configured to enable at least one output via the communication device 12 from the output group consisting of:
output of information from the evaluation device 90 to an output apparatus 14 in the vehicle, for example to a display or a speech generation apparatus,
output of information from the evaluation device 90 to a server of a workshop, for example provided by the vehicle manufacturer or a service provider,
output of information from the evaluation device 90 to a server of a fire department,
output of information from the evaluation device 90 to a server of a police station, and
output of information from the evaluation device 90 to other road users.

The communication device 12 preferably enables wireless data transmission. Examples of wireless data transmission include the Bluetooth industry standard, cellular mobile telephony, WLAN (Wireless Local Area Network) according to the Wi-Fi specification, or other radio transmission in a frequency range intended for this purpose.

Many variants and modifications are of course possible within the scope of the present invention.

What is claimed is:

1. An apparatus comprising:
a battery arrangement; and
a protective arrangement including acceleration sensors, a first layer, a second layer, and a third layer disposed between the first layer and the second layer,
wherein the third layer has a layer volume that is configured to be reduced under an effect of pressure,
wherein the acceleration sensors include at least one first acceleration sensor and at least one second acceleration sensor,
wherein the at least one first acceleration sensor is disposed in contact with the first layer and is configured to generate and output a first sensor signal as a function of acceleration, and
wherein the at least one second acceleration sensor is disposed in contact with the second layer and is configured to generate and output a second sensor signal as a function of acceleration in order to enable detection of damage to the protective arrangement.

2. The apparatus according to claim 1, wherein the protective arrangement is plate-shaped.

3. The apparatus according to claim 1, wherein the first layer and the second layer are non-compressible or at least less compressible than the third layer.

4. The apparatus according to claim 1, wherein the protective arrangement is sealed against moisture in at least one predetermined first region and in which the acceleration sensors are at least partly disposed in said at least one predetermined first region in order to enable protection against moisture.

5. The apparatus according to claim 1, wherein the protective arrangement is spaced apart from the battery arrangement at least in some sections, and wherein at least one cooling arrangement is disposed at least in regions between the battery arrangement and the protective arrangement, wherein the cooling arrangement is configured as a cooling plate.

6. The apparatus according to claim 1, wherein the protective arrangement at least partially abuts the battery arrangement either directly or via a spacer element.

7. The apparatus according to claim 1, wherein the battery arrangement comprises at least two battery module housings.

8. The apparatus according to claim 1, wherein the third layer comprises at least one substance from a group of substances consisting of: foam, gas, gas/liquid mixture, thermoplastic foam, elastomeric foam, and rigid foam.

9. The apparatus according to claim 1, wherein the first layer comprises a first composite material and the second layer comprises a second composite material.

10. The apparatus according to claim 9, wherein the first composite material and/or the second composite material are configured as fiber composite materials comprising first fibers.

11. The apparatus according to claim 1 further comprising an evaluation device configured to receive and evaluate the at least one first sensor signal and the at least one second sensor signal.

12. The apparatus according to claim 11, wherein the evaluation device is configured to determine a degree of damage to the protective arrangement as a function of the at least one first sensor signal and the at least one second sensor signal.

13. The apparatus according to claim 12, wherein the evaluation device is configured to calculate a difference between a first acceleration value of the at least one first sensor signal and a second acceleration value of the at least one second sensor signal in order to determine the degree of damage to the protective arrangement.

14. The apparatus according to claim 11, wherein the evaluation device is configured, over a temporal progression of the at least one first sensor signal and/or the at least one second sensor signal, (i) to determine a first time range in which an impact of the protective arrangement against the battery arrangement has occurred, and (ii) to determine the degree of damage as a function of the information of said sensor signal or said sensor signals in said first time range.

15. The apparatus according to claim 11, further comprising at least two first acceleration sensors and at least two second acceleration sensors, and wherein, either (i) the information of the first sensor signals or (ii) the information of the second sensor signals, is used to determine an areal extent of the damage to the protective arrangement in the first layer or in the second layer.

16. A vehicle, which is operated electrically or partially electrically, comprises the apparatus according to claim 11.

17. The vehicle according to claim 16, wherein the evaluation device is configured to carry out a categorization as a function of the at least one first sensor signal and the at least one second sensor signal, wherein the categorization comprises at least two categories from a category group comprising:
   a) no action required,
   b) replacement of the protective arrangement required at a next service,
   c) service visit required,
   d) parking the vehicle required, and
   e) parking and immediately exiting the vehicle required.

18. The vehicle according to claim 16, further comprising a communication device and in which the evaluation device is configured to enable at least one output via the communication device from an output group comprising:
   a) output of information from the evaluation device to an output apparatus in the vehicle,
   b) output of information from the evaluation device to a server of a workshop,
   c) output of information from the evaluation device to a server of a fire department,
   d) output of information from the evaluation device to a server of a police station, and
   e) output of information from the evaluation device to other road users.

* * * * *

UNITED STATES PATENT AND TRADEMARK OFFICE
CERTIFICATE OF CORRECTION

PATENT NO. : 12,381,263 B2
APPLICATION NO. : 17/903088
DATED : August 5, 2025
INVENTOR(S) : Philipp Kellner, Teiwen Fehse and Christopher Volkmer Page 1 of 1

It is certified that error appears in the above-identified patent and that said Letters Patent is hereby corrected as shown below:

On the Title Page

Item (30) Foreign Application Priority Data should read:
September 6, 2021 (DE)...................10 2021 122 956.1

Signed and Sealed this
Thirtieth Day of September, 2025

John A. Squires
*Director of the United States Patent and Trademark Office*